(12) United States Patent
Harney et al.

(10) Patent No.: US 7,988,150 B2
(45) Date of Patent: Aug. 2, 2011

(54) MEDIA TRANSPORT DEVICE WITH VACUUM-CONTROLLED POSITIONING

(75) Inventors: William M. Harney, Rush, NY (US); Gregory A. Ludgate, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 131 days.

(21) Appl. No.: 12/391,507

(22) Filed: Feb. 24, 2009

(65) Prior Publication Data

US 2010/0213666 A1 Aug. 26, 2010

(51) Int. Cl.
B65H 5/02 (2006.01)
(52) U.S. Cl. .......................................... 271/276; 271/196
(58) Field of Classification Search .................. 271/276, 271/196, 197, 96, 108
See application file for complete search history.

(56) References Cited

U.S. PATENT DOCUMENTS

| | | | |
|---|---|---|---|
| 3,698,706 A * | 10/1972 | Mihojevich et al. | 271/9.11 |
| 4,168,829 A * | 9/1979 | Wilson et al. | 271/108 |
| 5,423,255 A * | 6/1995 | Maass | 101/232 |
| 6,115,578 A | 9/2000 | Mandel et al. | |
| 6,279,896 B1 * | 8/2001 | Linder et al. | 271/98 |
| 6,464,219 B1 * | 10/2002 | Yee et al. | 271/276 |
| 6,543,948 B2 * | 4/2003 | Beehler et al. | 400/635 |
| 6,575,459 B1 * | 6/2003 | Kakiwaki et al. | 271/242 |
| 6,672,720 B2 * | 1/2004 | Smith | 347/104 |
| 6,779,861 B2 | 8/2004 | Mori | |
| 7,014,187 B2 | 3/2006 | Mayerberg, II et al. | |
| 7,172,666 B2 | 2/2007 | Groves et al. | |
| 7,333,208 B2 | 2/2008 | Mestha et al. | |
| 2006/0170149 A1 * | 8/2006 | Seto | 271/240 |

* cited by examiner

*Primary Examiner* — Michael McCullough
(74) *Attorney, Agent, or Firm* — Gibb I.P. Law Firm, LLC

(57) ABSTRACT

A machine which transports and processes print media can incorporate a vacuum chamber. The vacuum chamber can be within a print media transport device in order to maintain a print medium at a uniform predetermined distance from a print media processing device, such as an image printing device (e.g., an inkjet printer), an image scanning device, or a spectrophotometer). In one embodiment the vacuum chamber is located within a roller that transports print media past the processing device. In another embodiment the vacuum chamber is located on an opposite side of a belt that transports print media past the processing device. In each of the embodiments the size of the vacuum chamber opening, which defines the vacuum area on the transport device, and also the amount of vacuum pressure may be selectively adjusted depending upon the size and weight, respectively, of the print medium being processed.

6 Claims, 2 Drawing Sheets

MEDIA TRANSPORT DEVICE WITH VACUUM-CONTROLLED POSITIONING

BACKGROUND AND SUMMARY

Embodiments herein generally relate to machines which transport and process print media and, more particularly, to a machine that incorporates a vacuum chamber within a print media transport device in order to maintain a print medium at a uniform predetermined distance from a print media processing device (e.g., an image printing device, an image scanning device, or a spectrophotometer) during processing.

As background, for machines that incorporate print media processing devices, such as image printing devices (e.g., inkjet printing devices), image scanning devices and/or spectrophotometers, the distance separating the print medium from the key processing component of the processing device must be uniformly and precisely maintained to prevent processing errors. For example, in an inkjet printing device, the distance separating the inkjet printing head and the print medium should remain constant to avoid registration errors. In an image scanning device, the distance separating the mirror assembly from the print medium should remain constant to avoid image capturing errors. In a spectrophotometer, the distance separating the spectral photometric sensor assembly from the print medium should remain constant to avoid light intensity measurement errors (i.e., image quality measurement errors). Existing machines incorporate print media transport devices (e.g., rolls with idlers, electrostatic belts, etc.) that do not sufficiently secure print media during processing to ensure that such a uniform distance is maintained, particularly when the leading and/or trailing edges of print media sheets are passed from one print media transport device to another.

In view of the foregoing, disclosed herein are embodiments of a machine which transports and processes print media. The machine incorporates a vacuum chamber within a print media transport device in order to maintain a print medium at a uniform predetermined distance from a print media processing device, such as an image printing device (e.g., an inkjet printer), an image scanning device, or a spectrophotometer). In one embodiment the vacuum chamber is located within a roller (e.g., a drive roller) that transports print media past the processing device. In another embodiment the vacuum chamber is located on an opposite side of a belt (e.g., an electrostatic belt) that transports print media past the processing device. In each of the embodiments the size of the vacuum chamber opening which defines the vacuum area on the transport device, and also the amount of vacuum pressure may be selectively adjusted depending upon the size and weight, respectively, of the print medium being processed.

More particularly, disclosed herein are embodiments of a machine which transports and processes print media. This machine can comprise a print media processing device. Exemplary print media processing devices can include, but are not limited to, image printing devices (e.g., inkjet printers), image scanning devices, and spectrophotometers.

In one embodiment, this machine can comprise a roller and a vacuum chamber within the roller. Specifically, the roller can be located in a position directly opposite the print media processing device and can transport a print medium past the processing device. The roller can comprise an axle. A support surface can encircle the axle and can be separated from the axle by a space. The support surface can have an outer side contacting the print medium and an inner side. The support surface can further have perforations extending from the outer side to the inner side. The vacuum chamber can be located within the roller and, particularly, within the space between the axle and the support surface. The vacuum chamber can have an open end adjacent a portion of the inner side of the support surface. This open end can be the processing device. The edges of this open end can define a vacuum area on the roller.

In operation, the vacuum chamber can apply vacuum pressure to a print medium that is being transported by the roller past the print media processing device. Specifically, the vacuum pressure emanates from the open end of the vacuum chamber through the perforations in the support surface of the roller and, thereby secures the print medium to the outer side of the support surface. In doing so, the vacuum pressure maintains the print medium at a uniform predetermined distance from the processing device as the print medium is transported, by the roller, past the processing device.

In order to ensure that the vacuum pressure will work as needed, the open end of the vacuum chamber should be aligned below the print medium as it passes the processing device. Furthermore, the width of the open end of the vacuum chamber (i.e., the first width) and the width of the print sheet (i.e., the second width) should be approximately equal. It should be understood that the first and second widths are to be measured in a direction perpendicular to the direction of travel of the print medium (i.e., measured in the cross-process direction). Additionally, a seal between the vacuum chamber and, more particularly, between the edges of the open end of the vacuum chamber and the inner side of the support surface can be used to prevent vacuum leakage that would limit how well the print medium is secured to the support surface of the roller.

Optionally, to ensure adequate control of print media having different sizes, the vacuum chamber can comprise at least one movable wall in order to allow the width of the open end of the vacuum chamber to be selectively adjusted based on the width of the print medium. The machine can be configured so that this selective adjustment process can be performed manually. Alternatively, the machine can be configured so that this selective adjustment process can be performed automatically. For example, the machine can further comprise one or more size sensors. The size sensor(s) can measure the width of the print medium. The machine can also further comprise a controller that is in communication with the size sensor(s) and operatively connected to the vacuum chamber. The controller can receive the width measurement from the size sensor(s) and can cause the movable wall(s) to move in order to ensure that the width of the open end is approximately equal to and aligned with the width of the print medium.

Also, optionally, to ensure adequate control of print media having different weights, the vacuum chamber can have different vacuum pressure settings that can be selectively adjusted (i.e., the vacuum pressure can be varied) based on the weight of the print medium. The machine can be configured so that this selective adjustment process can be performed manually. Alternatively, the machine can be configured so that this selective adjustment process can be performed automatically. For example, the machine can comprise a weight sensor. The weight sensor can measure the weight of the print medium. The machine can also further comprise a controller that is in communication with the weight sensor and that is operatively connected to the vacuum chamber. The controller can receive the weight measurement from the weight sensor, can determine the amount of vacuum pressure to be applied based on the measured weight, and can cause the vacuum chamber to apply the determined amount of vacuum pressure.

In another embodiment, the machine can comprise a belt transport device and a vacuum chamber within the belt transport device. Specifically, the belt transport device can be located in a position directly opposite the print media processing device and can transport a print medium past the processing device. The belt transport device can comprise, for example, at least two rollers and a belt supported and moved by the rollers such that the belt travels past the processing device. The belt can have an outer side contacting the print medium and an inner side contacting the rollers. The belt can further have perforations extending from the outer side to the inner side. The vacuum chamber can be located within the belt between the rollers such that as the belt travels it moves around the rollers and vacuum chamber. The vacuum chamber can have an open end adjacent a portion of the inner side of the belt. This open end can be facing the processing device. The edges of this open end can define a vacuum area on the belt.

In operation, the vacuum chamber can apply vacuum pressure to the print medium that is being transported by the belt past the print media processing device. Specifically, the vacuum pressure emanates from the open end of the vacuum chamber through the perforations in the belt and, thereby secures the print medium to the outer side of the belt. In doing so, the vacuum pressure maintains the print medium at a uniform predetermined distance from the processing device as the print medium is transported, by the belt, past the processing device.

In order to ensure that the vacuum pressure will work as needed, the open end of the vacuum chamber should be aligned below the print medium as it passes the processing device. Furthermore, the width of the open end of the vacuum chamber (i.e., the first width) and the width of the print sheet (i.e., the second width) should be approximately equal. It should be understood that the first and second widths are to be measured in a direction perpendicular to the direction of travel of the print medium (i.e., measured in the cross-process direction). Additionally, a seal between the vacuum chamber and, more particularly, between the edges of the open end of the vacuum chamber and the inner side of the belt can be used to prevent vacuum leakage that would limit how well the print medium is secured to the outer surface of the belt.

Optionally, to ensure adequate control of print media having different sizes, the vacuum chamber can comprise at least one movable wall in order to allow the width of the open end of the vacuum chamber to be selectively adjusted based on the width of the print medium. The machine can be configured so that this selective adjustment process can be performed manually. Alternatively, the machine can be configured so that this selective adjustment process can be performed automatically. For example, the machine can further comprise one or more size sensors. The size sensor(s) can measure the width of the print medium. The machine can also further comprise a controller that is in communication with the size sensor(s) and operatively connected to the vacuum chamber. The controller can receive the width measurement from the size sensor(s) and can cause the movable wall(s) to move in order to ensure that the width of the open end is approximately equal to and aligned with the width of the print medium.

Also, optionally, to ensure adequate control of print media having different weights, the vacuum chamber can have different vacuum pressure settings that can be selectively adjusted (i.e., the vacuum pressure can be varied) based on the weight of the print medium. The machine can be configured so that this selective adjustment process can be performed manually. Alternatively, the machine can be configured so that this selective adjustment process can be performed automatically. For example, the machine can comprise a weight sensor. The weight sensor can measure the weight of the print medium. The machine can also further comprise a controller that is in communication with the weight sensor and that is operatively connected to the vacuum chamber. The controller can receive the weight measurement from the weight sensor, can determine the amount of vacuum pressure to be applied based on the measured weight, and can cause the vacuum chamber to apply the determined amount of vacuum pressure.

Also, optionally, the machine can be configured so as to ensure that the vacuum pressure is only applied when needed and otherwise turned off. Specifically, the machine can further comprise one or more monitors monitoring the arrival of a leading edge of the print medium into the vacuum area and also the departure of a trailing edge of the print medium from the vacuum area. The machine can also comprise a controller in communication with the leading/trailing edge monitor(s) and operatively connected to the vacuum chamber. The controller can receive, from the monitor(s), notifications sheet arrival and departure and can cause the vacuum pressure to be turned on in response to the arrival of the leading edge of the print medium in the vacuum area and off in response to the departure of the trailing edge of the print medium from the vacuum area.

These and other features are described in, or are apparent from, the following detailed description.

BRIEF DESCRIPTION OF THE DRAWINGS

Various exemplary embodiments of systems and methods are described in detail below, with reference to the attached drawing figures, in which.

DETAILED DESCRIPTION

Figure 1:
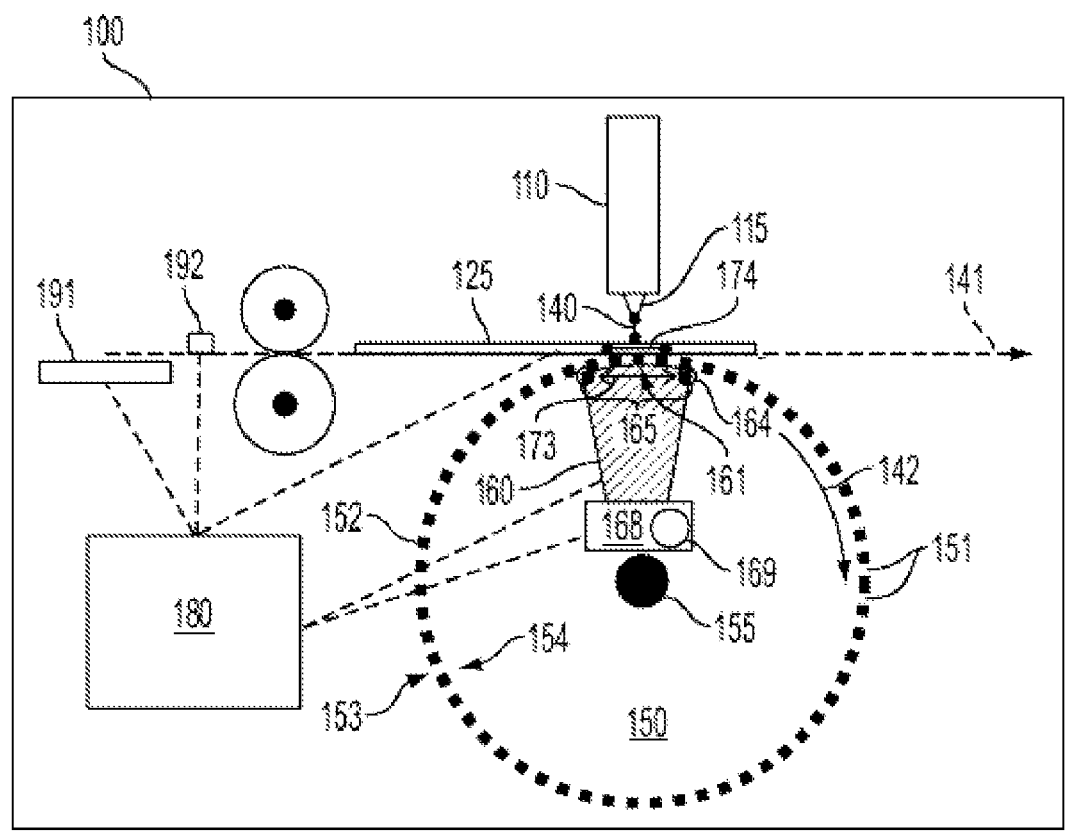
FIG. 1 is a schematic diagram illustrating an embodiment of a print media transport and processing machine.

The embodiments of the invention and the various features and advantageous details thereof are explained more fully with reference to the non-limiting embodiments that are illustrated in the accompanying drawings and detailed in the following description.

As mentioned above, for machines that incorporate print media processing devices, such as image printing devices (e.g., inkjet printing devices), image scanning devices and/or spectrophotometers, the distance separating the print medium from the key processing component of the processing device and must be uniformly and precisely maintained to prevent processing errors. For example, in an inkjet printing device (e.g., as described in detail in U.S. Pat. No. 6,779,861, issued on Aug. 24, 2004, assigned to Xerox Corporation, Norwalk, Conn. and incorporated herein its entirety by reference) the distance separating the inkjet printing head and the print medium should remain constant to avoid registration errors. In an image scanning device (e.g., as described in detail in U.S. Pat. No. 6,115,578, issued on Sep. 5, 2005, assigned to Xerox Corporation, Norwalk, Conn. and incorporated herein its entirety by reference), the distance separating the mirror assembly from the print medium should remain constant to avoid image capturing errors. In a spectrophotometer (e.g., as described in detail in U.S. Pat. No. 7,333,208, issued on Feb.

19, 2008, assigned to Xerox Corporation, Norwalk, Conn. and incorporated herein its entirety by reference), the distance separating the spectral photometric sensor assembly from the print medium should remain constant to avoid light intensity measurement errors (i.e., image quality measurement errors). Existing machines incorporate print media transport devices (e.g., rolls with idlers, electrostatic belts, etc.) that do not sufficiently secure print media during processing to ensure that such a uniform distance is maintained, particularly when the leading and/or trailing edges of print media sheets are passed from one print media transport device to another.

In view of the foregoing, disclosed herein are embodiments of a machine which transports and processes print media. The machine incorporates a vacuum chamber within a print media transport device in order to maintain a print medium at a uniform predetermined distance from a print media processing device, such as an image printing device (e.g., an inkjet printer), an image scanning device, or a spectrophotometer). In one embodiment the vacuum chamber is located within a roller (e.g., a drive roller) that transports the print media past the processing device. In another embodiment the vacuum chamber is located on an opposite side of a belt (e.g., an electrostatic belt) that transports the print media past the processing device. In each of the embodiments the size of the vacuum chamber opening, which defines the vacuum area (i.e., the vacuum footprint) on the transport device, and also the amount of vacuum pressure (suction) may be selectively adjusted depending upon the size and weight, respectively, of the print medium being processed.

Figure 3:
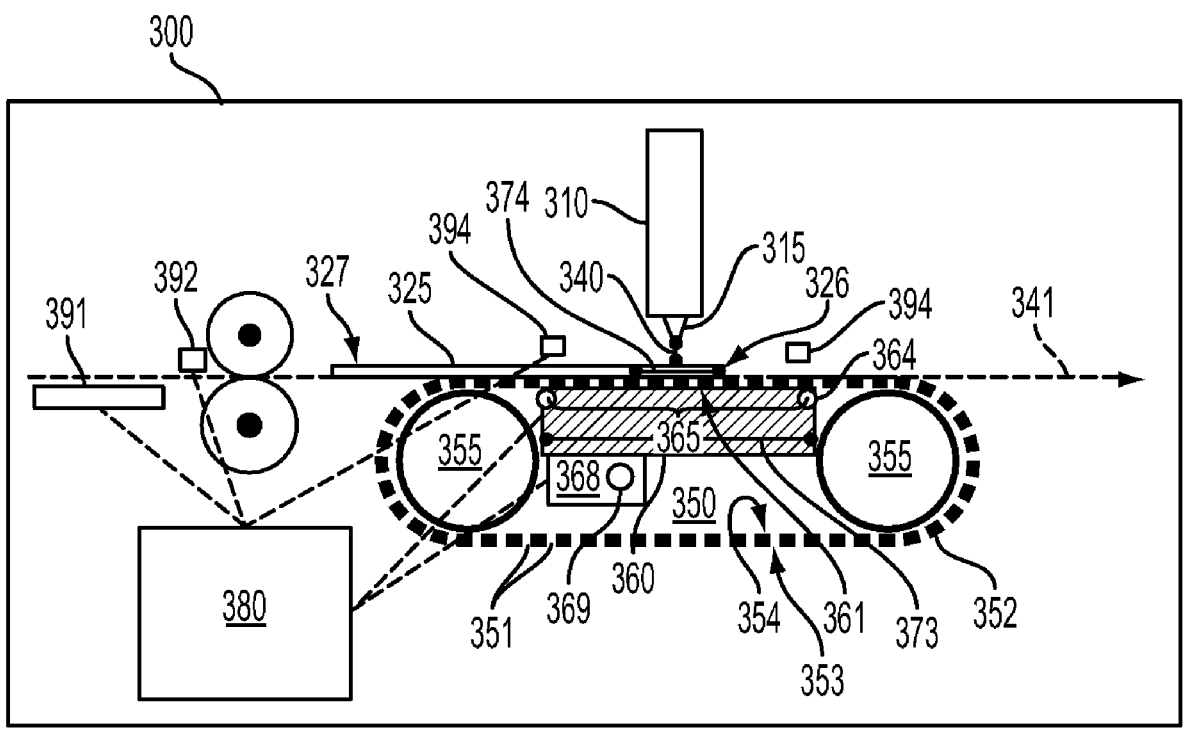
FIG. 3 is a schematic diagram illustrating another embodiment of a print media transport and processing machine.

More particularly, referring to FIGS. 1 and 3 disclosed herein are embodiments of a machine 100, 300, which transports and processes print media 125, 325. This machine 100, 300 can comprise a print media processing device 110, 310. Exemplary print media processing devices 110, 310 can include, for example, any print media processing device wherein it is important to maintain a uniform distance between it and the print medium 125, 325 in order to prevent processing errors. For example, the print media processing device 110, 310 can comprise an image printing device, such as the inkjet print (as described in detail in U.S. Pat. No. 6,779,861 incorporated by reference above), where the distance separating the inkjet printing head and the print medium should remain constant to prevent registration errors. The print media processing device 110, 310 can also comprise an image scanning device (e.g., as described in detail in U.S. Pat. No. 6,115,578 and incorporated by reference above), where the distance separating the mirror assembly from the print medium should remain constant to avoid image capturing errors. The print media processing device 110, 310 can also comprise a spectrophotometer (e.g., as described in detail in U.S. Pat. No. 7,333,208 incorporated by reference above), where the distance separating the spectral photometric sensor assembly from the print medium should remain constant to avoid light intensity measurement errors (i.e., image quality measurement errors).

Figure 2:
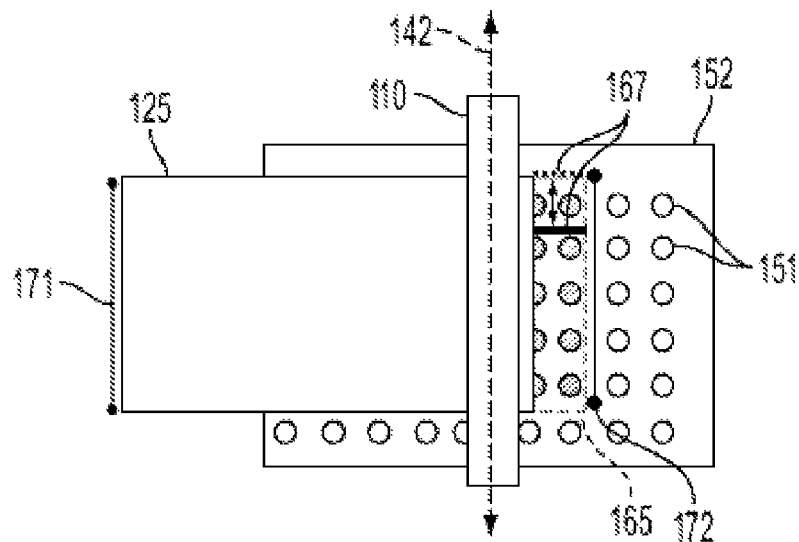
FIG. 2 is a top view diagram of the embodiment of FIG. 1.

Referring to FIG. 1 in combination with the top view diagram of FIG. 2, one embodiment of a print media transport and processing machine 100 can comprise a roller 150 and a vacuum chamber 160 within the roller 150. Specifically, the roller 150 can be located in a position directly opposite the print media processing device 110 and can be configured as a drive roller for transporting (i.e., can be adapted to transport) a print medium 125 past the processing device 110 or, more particularly, past a specific processing component 115 of the processing device 110 (e.g., an inkjet printing head, a mirror assembly, a spectral photometric sensor assembly, etc.).

Specifically, the roller 150 can comprise an axle 155 and a support surface 152 that encircles the axle 155. The support surface 152 can be fixed to the axle 155 at one or more locations such that when the axle 155 is rotated (e.g., by a drive motor (not shown)) the support surface 152 also rotates. The support surface 152 can be separated from the axle 155 by a space. That is, the roller 150 can be essentially hollow. The support surface 152 can comprise a smooth hard surface made from or coated in urethane, rubber or any other suitable roller material. Furthermore, the support surface 152 can have an outer side 153 contacting and supporting the print medium 125 as it passes the processing device 110 and an inner side 154. The support surface 152 can further have perforations 151 (e.g., holes, slits, etc.) extending from the outer side 153 to the inner side 154. The perforations 151 can be circular in shape, as shown, or can comprise other suitable shapes (e.g., squares, rectangles, etc.). The perforations 151 should be relatively small in size (e.g., circles having a diameter of 1-10 mm). Furthermore, the pattern of the perforations 151 should be such that the perforations 151 are distributed uniformly across the support surface 152.

The vacuum chamber 160 (i.e., a vacuum plenum) can be located within the roller 150 and, particularly, within the space between the axle 155 and the support surface 152. This vacuum chamber 160 can comprise a rigid enclosure from which air and other gases are removed by a vacuum source 168 (e.g., a vacuum pump) also internal to roller 150. A duct 169 extending from the vacuum source 168 to one end of the roller 150 can expel the air/gasses from the roller 150. Furthermore, the vacuum chamber 160 can have an open end 161 adjacent a portion of the inner side 154 of the support surface 152. This open end 161 can be facing (i.e., in a fixed position opposite) the processing device 110. The edges of this open end 161 (e.g., as bounded by the walls of the vacuum chamber 160) can define a vacuum area 165 (i.e., a vacuum footprint) on the roller 150.

In operation, the vacuum chamber 160 can apply (i.e., can be configured to apply) vacuum pressure to a print medium 125 that is being transported by the roller 150 past the print media processing device 110. Specifically, the vacuum pressure emanates from the open end 161 of the vacuum chamber 160 (i.e., from the defined vacuum area 165) through the perforations 151 in the support surface 152 of the roller 150 and, thereby secures the print medium 125 to the outer side 153 of the support surface 152. In doing so, the vacuum pressure maintains the print medium 125 at a uniform predetermined distance 140 from the processing device 110 or, more particularly, from the processing component 115 of the processing device 110 as the print medium 125 is transported, by the roller 150, past the processing device 110 for processing.

In order to ensure that the vacuum pressure will work as needed, the open end 161 of the vacuum chamber 160 should be aligned below the print medium 125 as it passes the processing device 110. Furthermore, the width 172 of the open end 161 of the vacuum chamber 160 (i.e., the first width) and the width 171 of the print sheet (i.e., the second width) should be approximately equal. It should be understood that the first and second widths 171, 172 are to be measured in a direction 142 perpendicular to the direction of travel 141 of the print medium 125 (i.e., measured in the cross-process direction 142). Additionally, the length 173 of the open end 161 of the vacuum chamber 160 should be greater than the length 174 of the processing area (i.e., the area acted upon by the processing component 115), as measured parallel to the direction of travel 141 of the print medium 125. However, this length 173 should not be so long as to cause the print medium 125 to deviate from its required direction of travel. For example, if the print medium 125 is to continue in the direction of travel 141, as illustrated, the length 173 should be predetermined so that the angle of the arc of the vacuum area 165 on the roller 150 is no greater than 30 degrees so as to prevent the print medium 125 from continuing to move with the roller 150 in the direction of rotation 142. Additionally, a seal 164 (e.g., a rubber o-ring) between the vacuum chamber 160 and, more particularly, between the edges of the open end 161 of the vacuum chamber 160 and the inner side 154 of the support surface 152 can be used to prevent vacuum leakage that would limit how well the print medium 125 is secured to the support surface 152 of the roller 150.

Optionally, to ensure adequate control of print media 125 having different sizes (e.g., different sheet widths), the vacuum chamber 160 can comprise at least one movable wall 167 in order to allow the width 172 of the open end 161 of the vacuum chamber 165 and, thereby the width of the vacuum area 165 to be selectively adjusted based on the width 171 of the print medium 125. Known techniques can be used to configure the chamber wall 167 as moveable. For example, the wall 167 can be configured to slide along a track within the floor of the chamber. The machine 100 can be configured so that this selective adjustment process can be performed manually (e.g., by turning a screw or actuating some other device to selectively adjust the position of the wall along a track). Alternatively, the machine 100 can be configured so that this selective adjustment process can be performed automatically. For example, the machine 100 can further comprise one or more conventional sheet size sensors 192. The sheet size sensor(s) 192 can measure the width 171 of the print medium 125. The machine 100 can also further comprise a controller 180 that is in communication with the size sensor(s) 192 and operatively connected to the vacuum chamber 160. The controller 180 can receive the width 171 measurement from the size sensor(s) 192 and can cause the movable wall(s) 167 to move in order to increase or decrease the width 172, as necessary, to ensure that it is approximately equal to and aligned with the width 171 of the print medium 125.

Also, optionally, to ensure adequate control of print media 125 having different weights, the vacuum chamber 160 can have different vacuum pressure settings that can be selectively adjusted (i.e., the vacuum pressure created by the vacuum source/pump 168 can be varied) based on the weight of the print medium 125. The machine 100 can be configured so that this selective adjustment process can be performed manually (i.e., by allowing a user to selectively adjust the vacuum source pressure setting). Alternatively, the machine 100 can be configured so that this selective adjustment process can be performed automatically. For example, the machine 100 can comprise a conventional sheet weight sensor 191. The sheet weight sensor 191 can measure the weight of the print medium 125. The machine 100 can also further comprise a controller 180 that is in communication with the weight sensor 191 and that is operatively connected to the vacuum chamber 160. Specifically, the controller 180 can receive the weight measurement from the weight sensor 191, can determine the amount of vacuum pressure that should be applied to the print medium based on the measured weight, and can communicate with the vacuum source 168 in order to selectively adjust the vacuum source pressure setting, as required, and, thereby cause the vacuum chamber 160 to apply the determined amount of vacuum pressure.

The controller 180 described above can comprise a single control unit, as illustrated in FIG. 1. Alternatively, discrete control units can be used to control vacuum chamber size and pressure settings.

Figure 4:
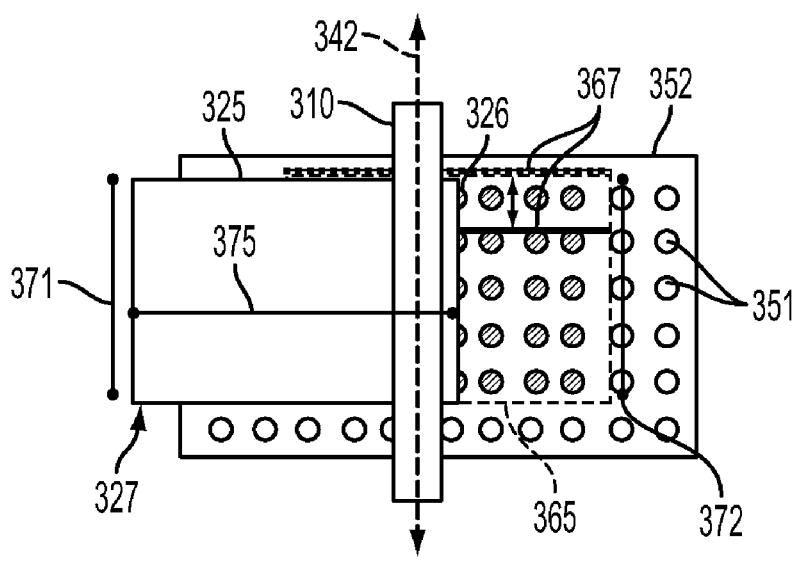
FIG. 4 is a schematic diagram illustrating a top view diagram of the embodiment of FIG. 3.

Referring to FIG. 3 in combination with the top view diagram of FIG. 4, another embodiment of a print media transport and processing machine 300 can comprise a belt transport device 350 and a vacuum chamber 360 within the belt transport device 350. Specifically, the belt transport device 350 can be located in a position directly opposite the print media processing device 310 and can be configured to transport a print medium 325 past the processing device 350 or, more particularly, past a specific processing component 315 of the processing device 310 (e.g., an inkjet printing head, a mirror assembly, a spectral photometric sensor assembly, etc.).

The belt transport device 350 can comprise, for example, at least two rollers 350 (including at least one configured as drive roller and, optionally, at least one configured as a steering roller). Additionally, the belt transport device 350 can comprise a belt 352 (e.g., vacuum belt) supported and moved by the rollers 355 such that the belt 352 travels past the processing device. The belt 352 can have an outer side 353 supporting and contacting the print medium 325 as it passes by the processing device 310 and an inner side 354 contacting the rollers 355. The belt 352 can further have perforations 351 (e.g., holes, slits, etc.) extending from the outer side 353 to the inner side 354. The perforations 351 can be circular in shape, as shown, or can comprise other suitable shapes (e.g., squares, rectangles, etc.). The perforations 351 should be relatively small in size (e.g., circles having a diameter of 1-10 mm). Furthermore, the pattern of the perforations 351 should be such that the perforations 351 are distributed uniformly across the belt 352.

The vacuum chamber 360 (i.e., vacuum plenum) can be located within the belt 352 between the rollers 355 such that as the belt 352 travels it moves around the rollers 355 and vacuum chamber 360. This vacuum chamber 360 can comprise a rigid enclosure from which air and other gases are removed by a vacuum source 368 (e.g., a vacuum pump) internal to the belt 352, as illustrated, or external to the belt 352. A duct 369 extending from the vacuum source 368 can expel the air/gasses. The vacuum chamber 360 can have an open end 361 adjacent a portion of the inner side 354 of the belt 352. This open end 361 can be facing (i.e., in a fixed position opposite) the processing device 310. The edges of this open end 361 (e.g., as bounded by the walls of the vacuum chamber 360) can define a vacuum area 365 (i.e., a vacuum footprint) on the belt 352.

In operation, the vacuum chamber 360 can apply (i.e., can be configured to apply) vacuum pressure to the print medium 325 that is being transported by the belt 352 past the print media processing device 310. Specifically, the vacuum pressure emanates from the open end 361 of the vacuum chamber 360 (i.e., from the defined vacuum area) through the perforations 351 in the belt 352 and, thereby secures the print medium 325 to the outer side 353 of the belt 3521. In doing so, the vacuum pressure maintains the print medium 325 at a uniform predetermined distance 340 from the processing device 310, as the print medium 325 is transported, by the belt 352, past the processing device 310 for processing.

In order to ensure that the vacuum pressure will work as needed, the open end 361 of the vacuum chamber 360 should be aligned below the print medium 325 as it passes the processing device 310. Furthermore, the width 372 of the open end 361 of the vacuum chamber 360 (i.e., the first width) and the width 371 of the print sheet (i.e., the second width) should be approximately equal. It should be understood that the first and second widths 371, 372 are to be measured in a direction perpendicular to the direction of travel 341 of the print medium (i.e., measured in the cross-process direction 342).

Additionally, the length 373 of the open end 361 of the vacuum chamber 360 should be greater than the length 374 of the processing area (i.e., the area acted upon by the processing component 315), as measured parallel to the direction of travel 341 of the print medium 325. Additionally, a seal 364 (e.g., a rubber o-ring) between the vacuum chamber 360 and, more particularly, between the edges of the open end 361 of the vacuum chamber 360 and the inner side 354 of the belt 352 can be used to prevent vacuum leakage that would limit how well the print medium 325 is secured to the outer surface 353 of the belt 352.

Optionally, to ensure adequate control of print media 325 having different sizes (e.g., different sheet widths/lengths), the vacuum chamber 360 can comprise at least one movable wall 367 in order to allow the width 372 and/or the length 373 of the open end 361 of the vacuum chamber 360 to be selectively adjusted based on the width 371 and/or length 375 of the print medium 325. Known techniques can be used to configure the chamber wall 367 as moveable. For example, the wall 367 can be configured to slide along a track within the floor of the chamber. The machine 300 can be configured so that this selective adjustment process can be performed manually (e.g., by turning a screw or actuating some other device to selectively adjust the position of the wall along a track). Alternatively, the machine 300 can be configured so that this selective adjustment process can be performed automatically. For example, the machine 300 can further comprise one or more conventional sheet size sensors 392. The sheet size sensor(s) 392 can measure the width 371 and/or length 375 of the print medium 325. The machine 300 can also further comprise a controller 380 that is in communication with the size sensor(s) 392 and operatively connected to the vacuum chamber 360. The controller 380 can receive the sheet width 371 measurement from the size sensor(s) 392 and can cause the movable wall(s) 367 to move in order to increase or decrease the chamber width 372, as necessary, to ensure that it is approximately equal to and aligned with the width 371 of the print medium 325. Optionally, the controller 380 can similarly receive the sheet length 375 measurement from the size sensor(s) 392 and can cause the moveable walls(s) to move in order to increase or decrease the chamber length 373, as necessary to ensure that it is approximately equal to and aligned with the length 375 of the print medium 325.

Also, optionally, to ensure adequate control of print media 325 having different weights, the vacuum chamber 360 can have different vacuum pressure settings that can be selectively adjusted (i.e., the vacuum pressure created by the vacuum source 368 can be varied) based on the weight of the print medium 325. The machine 300 can be configured so that this selective adjustment process can be performed manually (i.e., by allowing a user to selectively adjust the vacuum source pressure setting). Alternatively, the machine 300 can be configured so that this selective adjustment process can be performed automatically. For example, the machine 300 can comprise a conventional sheet weight sensor 391. The weight sensor 391 can measure the weight of the print medium 325. The machine 300 can also further comprise a controller 380 that is in communication with the weight sensor 391 and that is operatively connected to the vacuum chamber 360. Specifically, the controller 380 can receive the weight measurement from the weight sensor 391, can determine the amount of vacuum pressure that should be applied to the print medium 325 based on the measured weight, and can communicate with the vacuum source 368 in order to selectively adjust the vacuum source pressure setting, as required, and, thereby cause the vacuum chamber 360 to apply the determined amount of vacuum pressure.

Also, optionally, the machine 300 can be configured so as to ensure that the vacuum pressure is only applied when needed and otherwise turned off (e.g., to conserve energy or allow easier, more efficient, transfer print sheets between transport belts). Specifically, the machine 300 can further comprise one or more monitors 394 monitoring (i.e., adapted to monitor) the arrival of a leading edge 326 of the print medium 325 into the vacuum area 365 and also the departure of a trailing edge 327 of the print medium 325 from the vacuum area 365. These monitors can comprise, for example, conventional sheet position monitors. The machine 300 can also comprise a controller 380 in communication with the leading/trailing edge monitor(s) 394 and operatively connected to the vacuum chamber 360. The controller 380 can receive, from the monitor(s) 394, notifications of the arrival and the departure of the print medium 325 from the vacuum area 365 and can cause the vacuum pressure from the vacuum source/pump 368 to be turned on in response to the arrival of the leading edge 326 of the print medium and off in response to the departure of the trailing edge 327. Alternatively, the vacuum duct 369 could be on a valve system and timed to match turning on with the arrival of the leading edge 326 of sheet 325 in the vacuum area 365 start and turning off with the departure of the trailing edge 327 from the area 365.

The controller 380 described above can comprise a single control unit, as illustrated in FIG. 3. Alternatively, discrete control units can be used to control vacuum chamber size, pressure, and on/off settings.

It should be understood that the terms "image printing device", "printing device", "printing engines", "printing machine", "printer", etc., as used herein encompasses any of a digital copier, bookmaking machine, facsimile machine, multi-function machine, etc. which performs a print outputting function. The details of printing devices (e.g., printers, printing engines, etc.) are well-known by those ordinarily skilled in the art. Printing devices are readily available devices produced by manufacturers such as Xerox Corporation, Norwalk, Conn., USA. Such printing devices commonly include input/output, power supplies, processors, media movement devices, marking devices etc., the details of which are omitted herefrom to allow the reader to focus on the salient aspects of the embodiments described herein. It should also be understood that the terms "image scanning device", "scanning device", "scanner", etc. as used herein encompasses any device that optically scans images, pictures, figures, drawings, printed text, handwritten text, etc. contained on a print media sheet and converts them into a digital image. It should be understood that the term "spectrophotometer" as used herein encompasses any photometer capable of measuring light intensity as a function of color (i.e., wavelength), for example, to measure image quality. Finally, it should be understood that the term "print medium" as used herein encompasses any cut sheet or roll of print media suitable for receiving images, pictures, figures, drawings, printed text, handwritten text, etc. Exemplary print media include, but are not limited to, a paper, plastic, and vinyl.

It should further be understood that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

Therefore, disclosed above are embodiments of a machine which transports and processes print media. The machine incorporates a vacuum chamber within a print media transport device in order to maintain a print medium at a uniform predetermined distance from a print media processing device, such as an image printing device (e.g., an inkjet printer), an image scanning device, or a spectrophotometer). In one embodiment the vacuum chamber is located within a roller (e.g., a drive roller) that transports print media past the processing device. In another embodiment the vacuum chamber is located on an opposite side of a belt (e.g., an electrostatic belt) that transports print media past the processing device. In each of the embodiments the size of the vacuum chamber opening, which defines the vacuum area on the transport device, and also the amount of vacuum pressure may be selectively adjusted depending upon the size and weight, respectively, of the print medium being processed.

What is claimed is:

1. A machine comprising:
   a processing device;
   a roller;
   an axle extending through a center of said roller, said roller rotating about said axle so as to transport a print medium past said processing device, and said roller comprising a support surface and said support surface having an outer side contacting said print medium, an inner side, and perforations extending from said outer side to said inner side;
   a vacuum chamber within said roller, said vacuum chamber comprising a rigid enclosure positioned between said axle and said inner side of said support surface and having an open end facing said processing device such that said open end is adjacent to only a portion of said inner side of said support surface,
      said portion being less than half a circumference of said roller, said roller further rotating about said axle past said open end,
      said vacuum chamber applying vacuum pressure to said print medium through said perforations so as to secure said print medium to said outer side and maintain said print medium at a uniform predetermined distance from said processing device as said print medium is transported, by said roller, past said processing device, and
      said vacuum chamber comprising at least one movable wall allowing a first width of said open end of said vacuum chamber to be selectively adjusted based on a second width of said print medium, said first width and said second width being measured in a direction perpendicular to a direction of travel of said print medium;
   a sensor measuring said second width of said print medium; and
   a controller receiving said second width from said sensor, said controller further being operatively connected to said vacuum chamber and causing said at least one movable wall to move so as to ensure that said first width of said open end is approximately equal to and aligned with said second width of said print medium.

2. The machine of claim 1, said processing device comprising one of an image printing device, an image scanning device, and a spectrophotometer.

3. The machine of claim 1, further comprising a seal between said vacuum chamber and said inner side.

4. A machine comprising:
   a processing device;
   a roller;
   an axle extending through a center of said roller, said roller rotating about said axle so as to transport a print medium past said processing device, and said roller comprising a support surface and said support surface having an outer side contacting said print medium, an inner side, and perforations extending from said outer side to said inner side;
   a first sensor measuring a weight of said print medium;
   a vacuum chamber within said roller, said vacuum chamber comprising a rigid enclosure positioned between said axle and said inner side of said support surface and having an open end facing said processing device such that said open end is adjacent to only a portion of said inner side of said support surface, said portion being less than half a circumference of said roller, said roller further rotating about said axle past said open end, and said vacuum chamber comprising at least one movable wall allowing a first width of said open end of said vacuum chamber to be selectively adjusted based on a second width of said print medium, said first width and said second width being measured in a direction perpendicular to a direction of travel of said print medium;
   a controller receiving said weight from said first sensor, said controller further being operatively connected to said vacuum chamber and causing said vacuum chamber to apply vacuum pressure to said print medium through said perforations so as to secure said print medium to said outer side and maintain said print medium at a uniform predetermined distance from said processing device as said print medium is transported, by said roller, past said processing device, wherein an amount of said vacuum pressure applied to said print medium is varied and is determined by said controller based on said weight; and
   a second sensor measuring said second width of said print medium,
   said controller receiving said second width from said second sensor and causing said at least one movable wall to move so as to ensure that said first width of said open end is approximately equal to and aligned with said second width of said print medium.

5. The machine of claim 4, said processing device comprising one of an image printing device, an image scanning device, and a spectrophotometer.

6. The machine of claim 4, further comprising a seal between said vacuum chamber and said inner side.

* * * * *